E. A. NELSON.
INDUCTION CONDUIT FOR EXPLOSION ENGINES.
APPLICATION FILED JULY 16, 1909.
992,235.
Patented May 16, 1911.
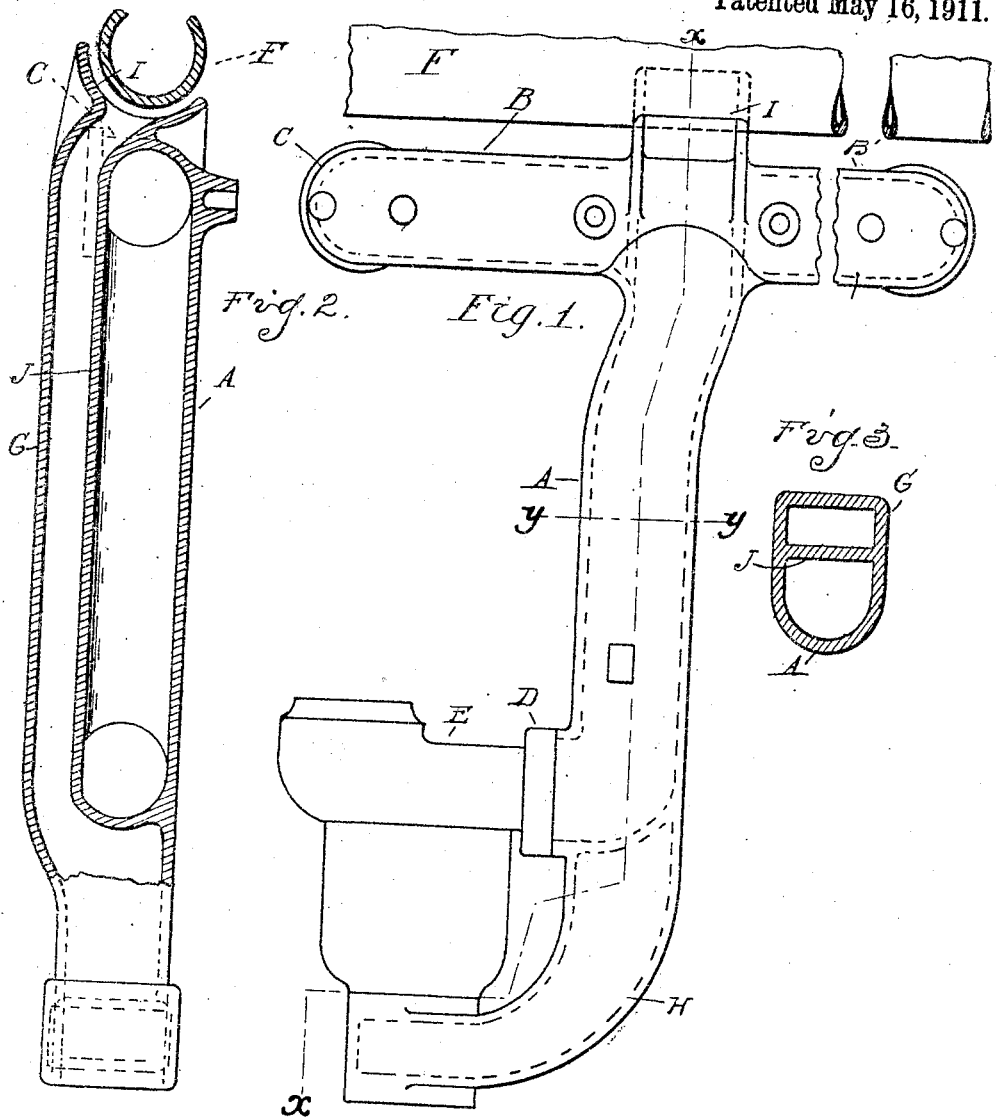
Witnesses
A. Belknap
James P. Barry
Inventor
Emil A. Nelson
By Whitmore Herbert Whitmore
attys.

UNITED STATES PATENT OFFICE.

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

INDUCTION-CONDUIT FOR EXPLOSION-ENGINES.

992,235.  Specification of Letters Patent.  Patented May 16, 1911.

Application filed July 16, 1909. Serial No. 508,031.

*To all whom it may concern:*

Be it known that I, EMIL A. NELSON, a citizen of the United States of America, residing at Detroit, in the county of Wayne and State of Michigan, have invented certain new and useful Improvements in Induction-Conduits for Explosion-Engines, of which the following is a specification, reference being had therein to the accompanying drawings.

It is the object of the invention to provide a simple and compact construction of induction conduit connecting the carbureter to the various cylinders of a multi-cylinder engine, and it is a further object to effect the warming of the combustible mixture during its passage through said conduit.

To this end, the invention consists in a construction as hereinafter set forth.

In the drawings—Figure 1 is an elevation of the induction conduit; Fig. 2 is a longitudinal section of the line $x$—$x$ Fig. 1; and, Fig. 3 is a horizontal section on the line $y$—$y$ Fig. 1.

In the specific embodiment of my invention illustrated, the induction conduit is intended for application to a four-cylinder explosion engine, having two induction ports in the engine casing, each located between a pair of cylinders. As both of these ports are to be connected to the same carbureter, the induction conduit comprises a main conduit A and two branch conduits B B', preferably in the form of a T. The branch conduits terminate in flanged elbows C, which are coupled to the engine casing, and the main conduit A has a lateral connection D to the carbureter E. When secured in position on the engine casing, the portions B B' lie adjacent to the exhaust conduit F—indicated in dotted lines, Fig. 2.

G is a conduit extending parallel to the conduit A and having a curved extension H below the latter, which connects with the inlet port of the carbureter. The upper end of this conduit G passes around the branches B B and has a flanged mouth I of segmental form, which partially encircles the exhaust conduit F, but is spaced therefrom.

In operation, the suction of the engine will draw the air through the flanged mouth I around the exhaust pipe F, which will impart its heat to the air before it enters the conduit. After passing through the carbureter, the explosive mixture returns through the conduit A, and, as this is separated from the conduit G merely by the thin wall J, a portion of the heat of the incoming air is imparted to the carbureted air, which has been lowered in temperature. In the further movement of the mixture, it will pass through the branch conduits B B', which lie adjacent to the exhaust conduit F, and are further heated therefrom.

The induction conduit is preferably formed of an integral casting, which may be easily attached or detached from the engine casing.

What I claim as my invention is:

1. An induction conduit for explosion engines, comprising a T-shaped casting having complementary conduits formed in the stem portion thereof forming inlet and outlet connections to the carbureter, and branch conduits from the outlet conduit formed in the T-portion of the casting.

2. The combination with the exhaust conduit of an explosion engine, of an induction conduit comprising a T-shaped casting having its cross portion lying in proximity and substantially parallel to the exhaust conduit, the stem portion having two complementary conduits formed therein leading respectively to and from the carbureter, the latter conduit connecting with the branches in the cross portion, and the former being provided with a flange mouth adjacent the exhaust conduit.

3. An induction conduit for explosion engines, comprising a T-shaped casting formed with branch conduits in the cross portion thereof, complementary conduits in the stem portion thereof, one being connected with said branch conduits and the other being open at its end adjacent the branch conduit, the lower ends of said complementary conduits being connected to the carbureter respectively at the center and bottom thereof.

4. In an induction conduit for explosion engines, the combination with a T-shaped casting having the end of the stem portion opposite the cross portion bent laterally, said stem portion carrying complementary conduits formed therein leading respectively to and from the carbureter, and being connected with the latter at the side and bottom, and the cross portion of the T forming branch conduits connected with the outgoing conduit from the carbureter.

5. An induction conduit for explosion engines comprising an integral member divided interiorly by a longitudinal partition into complementary ingoing and outgoing conduits leading respectively to and from the carbureter.

6. An induction conduit for explosion engines, comprising an integral member divided interiorly by a longitudinal partition into complementary ingoing and outgoing conduits leading respectively to and from the carbureter, one of said conduits extending beyond the other, for the purpose described.

7. The combination with an explosion engine and the exhaust conduit therefor, of an induction conduit and a carbureter, said induction conduit being divided interiorly by a longitudinal partition into complementary passages one of said passages leading from a port in the engine casing to the carbureter, and the other forming the air inlet for the carbureter and leading from the latter to the exhaust conduit and terminating in a flanged mouth adapated to embrace the exhaust conduit.

In testimony whereof I affix my signature in presence of two witnesses.

EMIL A. NELSON.

Witnesses:
CHAS. D. HASTINGS,
JOHN E. BAKER.